United States Patent

Pittman

[15] 3,685,087
[45] Aug. 22, 1972

[54] REAR VIEW MIRROR WIPER MECHANISM

[72] Inventor: Maurice B. Pittman, 1786 Oakwood, Memphis, Tenn. 36116

[22] Filed: July 13, 1970

[21] Appl. No.: 54,439

[52] U.S. Cl.................................15/250.24, 350/61
[51] Int. Cl..................................................B60s 1/20
[58] Field of Search..........15/250.01, 250.02, 250.1, 250.11,15/250.24, 250.25, 250.26, 250.29; 350/61

[56] References Cited

UNITED STATES PATENTS

| 1,803,722 | 5/1931 | Moon | 15/250.24 |
| 3,289,237 | 12/1966 | Lindsey | 15/205.24 |
| 1,345,330 | 6/1920 | Shea | 15/250.29 |
| 1,484,251 | 2/1924 | Brennan | 15/250.29 X |
| 2,814,823 | 12/1957 | Werner | 15/250.22 |
| 2,913,754 | 11/1959 | Vander Zee | 350/61 X |
| 3,526,920 | 9/1970 | Boyanich, Sr. | 15/250.29 |

FOREIGN PATENTS OR APPLICATIONS 651,948  10/1928  France..................15/250.24

Primary Examiner—Peter Feldman
Attorney—William S. Dorman

[57] ABSTRACT

A wiper mechanism for relatively large rear view mirrors of trucks, and the like, wherein a wiper blade extends substantially across the mirror and is reciprocal therealong for wiping of the reflecting surface thereof. The wiper blade is operably connected to a motor which may be selectively actuated by the driver of the vehicle for cleaning of the mirror as required.

4 Claims, 5 Drawing Figures

PATENTED AUG 22 1972 3,685,087

INVENTOR.
MAURICE B. PITTMAN
BY William S. Dorman
ATTORNEY

REAR VIEW MIRROR WIPER MECHANISM

This invention relates to improvements in wiping apparatus and more particularly, but not by way of limitation to a wiper mechanism for the rear view mirrors of large vehicles.

Large vehicles, such as trucks and the like, are normally provided with relatively large rear view mirrors due to the large structure of the rear portions of the vehicle. These mirrors are usually provided on each side of the vehicle cab and are extremely important to the driver of the large vehicle for facilitating manipulation thereof as well as for safety purposes during operation of the vehicle. Under adverse weather conditions and other road or driving conditions, the mirrors frequently become dirty and the rear vision reflected therein is impaired. It will be readily apparent that this condition may result in a safety hazard during the operation of the vehicle.

The present invention contemplates a novel wiper mechanism for the rear view mirrors of large vehicles which may be selectively actuated by the driver of the vehicle without hindering his operation of the vehicle. The novel wiper mechanism comprises a wiper blade disposed adjacent the reflecting surface of the mirror and reciprocal therealong for wiping or cleaning of the mirror through a squeegee action similar to that of the usual windshield wiper blade. The wiper arm is reciprocally mounted on a guide track device and is driven by a suitable motor carried by the mirror. The motor is operably connected with the power source of the vehicle, and may be selectively actuated by a suitable switch provided in the cab of the vehicle and readily accessible to the vehicle driver. In addition, yieldable means is provided for constantly urging the blade into engagement with the mirror for maintaining the most desirable pressure thereagainst in order to assure an efficient wiping action for the blade. When the motor is activated, the blade is continually reciprocated along the reflecting surface of the mirror for a cleaning or wiping thereof. When it is no longer necessary or desirable to move the wiper blade across the mirror surface, the motor may be deactivated, and the wiper blade will remain stationary until needed again. Thus, the vehicle rear view mirrors may be maintained substantially clear and clean without requiring stopping of the vehicle or otherwise interferring with the normal operation thereof.

It is an important object of this invention to provide a novel wiper mechanism for the rear view mirror of large vehicles which may be selectively actuated by the vehicle driver for cleaning and wiping of the reflecting surface of the mirror.

It is another object of this invention to provide a novel wiper mechanism for the rear view mirror of large vehicles wherein the entire reflective surface of the mirror may be wiped for maintaining an efficient visual use of the mirror.

Another object of this invention is to provide a novel wiper mechanism for the rear view mirrors of large vehicles wherein the mirror may be cleaned or wiped without interrupting the normal operation of the vehicle.

Still another object of this invention is to provide a novel wiper mechanism for the rear view mirrors of large vehicles which is simple and efficient in operation an economical and durable in construction.

Other and further objects and advantageous features of the present invention will hereinafter more fuller appear in connection with a detailed description of the drawings in which.

Figure 3:
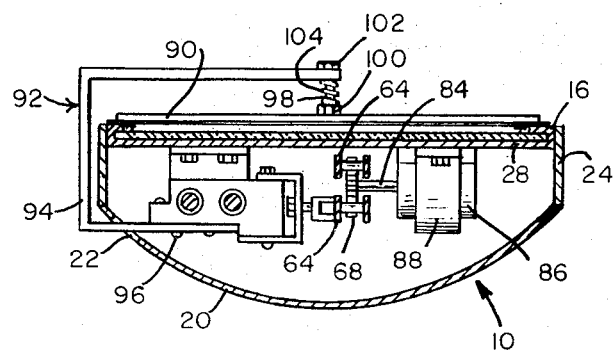
FIG. 3 is a view taken on line 3—3 of FIG. 2, and including the rear cover member.
Figure 2:
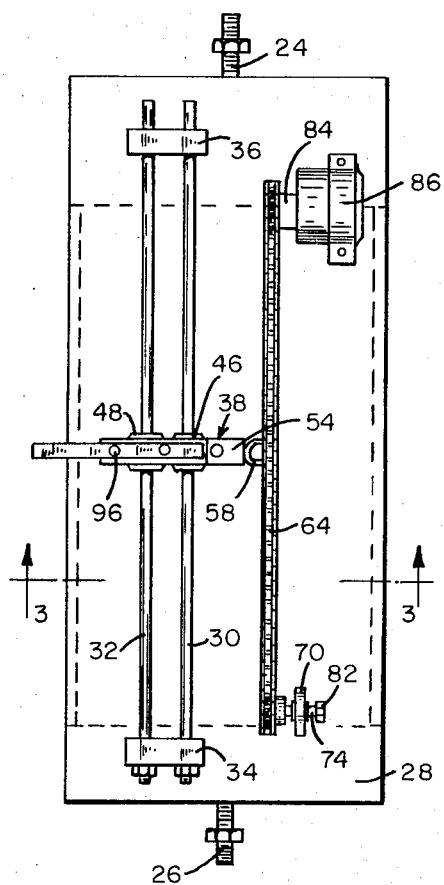
FIG. 2 is a rear view of a rear view mirror provided with a wiper mechanism embodying the invention and having the rear cover member removed for purposes of illustration.
Figure 1:
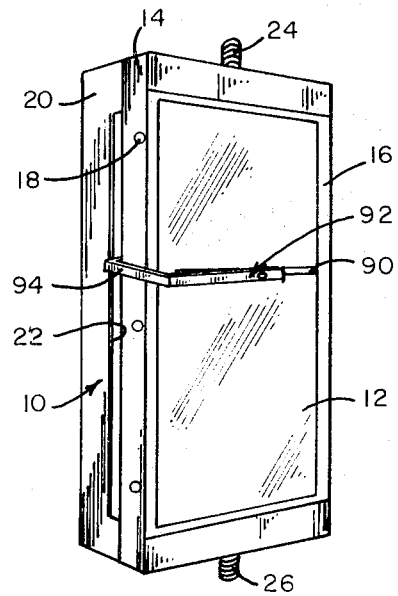
FIG. 1 is a perspective view of a rear view mirror provided with a wiper mechanism embodying the invention.
Figure 4:
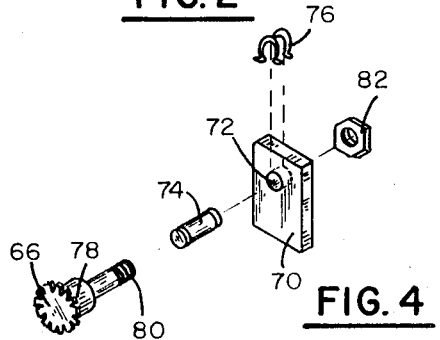
FIG. 4 is an exploded perspective view of a sprocket mounting means utilized in the invention.
Figure 5:
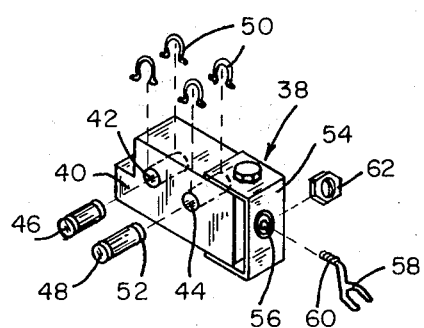
FIG. 5 is an exploded perspective view of a travel block for a guide track utilized in the invention.

Referring to the drawings in detail, reference character 10 generally indicates a relatively large rear view mirror for large vehicles, such as trucks, or the like. The mirror 10 may be of any suitable type and as shown herein comprises a substantially rectangular reflecting surface 12 secured within a substantially rectangular housing 14 by an angle member or frame member 16 which may be secured to the housing 14 in any well known manner, such as by a plurality of spaced screws 18. The housing 14 is open at the back thereof and a cover member 20 is removably secured thereto in any well known manner (not shown). An elongated slot or recess 22 is provided along one edge of the cover 20 for a purpose as will be hereinafter set forth. In addition, suitable oppositely disposed attaching studs 24 and 26 are provided on the housing 14 and extended outwardly therefrom for securing the mirror 10 to the usual support or brace member (not shown) for securing the mirror 10 to the sides of a vehicle (not shown) as is well known.

A plate member 28 is disposed within the housing 14 adjacent the rear surface of the reflective surface 12 and may be secured therein in any well known manner (not shown). A pair of longitudinally extending guide rails 30 and 32 are secured to the plate 28 by a pair of support blocks 34 and 36. The rails 30 and 32 are spaced outwardly from the exposed surface of the plate 28 and are disposed in substantially parallel relationship for guiding a travelling block member generally indicated at 38 for a purpose and in a manner as will be hereinafter set forth. The travelling block 38 comprises a block member 40 having a pair of spaced bores 42 and 44 therein for receiving nylon bushing sleeves 46 and 48, or the like, therethrough, respectively. The sleeves 46 and 48 are retained within the bores 42 and 44 by suitable snap or key members 50 which engage annular recesses 52 provided on the outer periphery of the sleeves. The rods 32 and 30 extend through the sleeves 46 and 48, respectively, and the sleeves 46 and 48 are slidable on the rods. A substantially U-shaped bracket member 54 is suitably secured to one end of the block 40 and is provided with an aperture (not shown) for receiving a nylon bushing 56, or the like. A biforcated connector member 58 extends through the bushing 56 and is rotatable therein. The outer end of the connector 58 is threaded at 60 and a lock washer 62 may be secured thereon for retaining the connector 58 in position within the bushing 56.

The connector 58 is suitably connected with an endless chain 64 which is spaced from and substantially parallel with the rods 30 and 32. The chain 64 extends between a pair of sprockets 66 and 68. The sprocket 66 is secured to the plate 28 by a support member 70 which is secured to the plate in any suitable manner (not shown). The support 70 is provided with a bore 72 for receiving a bushing 74 which is secured therein by snap or key members 76. The sprocket 66 is provided with a shaft 78 which extends through the bushing 74 and is rotatable therein. The shaft 78 is threaded at 80 for receiving a lock nut 82 to retain the shaft in the bushing 74.

The sprocket 68 is suitably secured to the drive shaft 84 of a motor 86 which is secured to the plate 28 by a strap 88, as is well known. The motor 86 is operably connected with the electrical system of the vehicle (not shown) for selective operation thereby. It is preferable to provide a control or off-on switch (not shown) in the cab of the vehicle for selective operation by the driver in order to provide for selective actuation of the motor 86.

A wiper blade 90 is disposed adjacent the reflecting surface 12 and is carried by a holder element generally indicated at 92. The holder 92 comprises a substantially U-shaped arm 94 having one end thereof secured to the travelling block 38 in any suitable manner, such as by a plurality of screws 96, and the opposite end thereof secured to the blade 90 by a shaft 98. One end of the shaft is secured to the blade 90 in any well known manner, such as by a lock nut 100, and the opposite end of the shaft 98 extends through the arm 94 and is retained therein by a second lock nut 102. A suitable spring member 104 is disposed around the shaft 98 and is interposed between the arm 94 and the lock nut 100. The spring 104 is preferably of a preselected pressure or spring force and constantly urges the blade 90 against the reflecting surface 12 at the optimum pressure for assuring an efficient wiping thereof, as will be hereinafter set forth. Of course the force of the spring 104 may be adjusted by the lock nut 102, as is well known.

When it is desired to wipe the reflecting surface 12 the motor 86 may be actuated by the switch (not shown) provided in the cab of the vehicle (not shown). The motor 86 rotated the sprocket 68 for driving the chain 64 around the sprockets 66 and 68 in the usual manner. The travelling block 38 is carried by the chain 64 and reciprocates along the guide rails 30 and 32 as the belt 64 moves continuously around the sprockets. Of course, the rails 30 and 32 are sufficiently long, and the sprockets 66 and 68 are spaced apart a sufficient distance that the travelling block 38 will move or reciprocate through a distance substantially equal to the length of the reflecting surface 12. The arm 94 and wiper blade 90 are carried with the travelling block 38 and during the reciprocation of the block 38, the wiper 90 is reciprocated along the reflecting surface 12 for a wiping and cleaning thereof. The spring 104 maintains the wiper blade in a constant pressure engagement with the surface 12 for assuring an efficient wiping thereof.

When it is no longer necessary to wipe the surface 12, the motor may be deactivated by the switch, and the entire operation of the apparatus 10 will be ceased.

From the foregoing, it will be apparent that the present invention provides along wiper mechanism for relatively large rear view mirrors for trucks and the like. A wiper blade is reciprocated a long the reflecting surface of the mirror in much the same manner as the usual windshield wiper blade, and efficiently wipes and cleans the mirror when needed. The blade is carried by a travelling block which is reciprocated along a guide rail apparatus by an endless chain driven by a motor which is selectively actuated by the drive of the vehicle. Thus, the mirror may be cleaned as needed without interrupting the normal operation of the vehicle.

Whereas the present invention has been described in particular relation to the drawings attached hereto, it should be understood that other and further modifications, apart from those shown or suggested herein, may be made within the spirit and scope of this invention.

WHAT IS CLAIMED IS:

1. A wiper mechanism for rear view mirrors of vehicles comprising a reflecting surface, horizontally disposed wiper blade means disposed adjacent the reflecting surface, guide means operably connected with the blade means for reciprocating the blade means vertically along the reflecting surface, chain means operably connected with the guide means for transmitting reciprocal movement thereto, and drive means connected with the chain means operably connected with the guide means for transmitting reciprocal movement thereto, drive means connected with the chain means for selective actuation thereof, and wherein the guide means comprises a plurality of mutually parallel non-rotatable guide rods secured in spaced relationship from the rear of the reflecting surface, travelling block means slidably disposed on the guide rails, said wiper blade means being secured to the travelling block means for movement simultaneously therewith, and connecting means provided on the travelling block means for connecting the travelling block means with the chain means for reciprocation of the travelling block means along the guide rods.

2. A wiper mechanism for rear view mirrors of vehicles comprising a reflecting surface, horizontally disposed wiper blade means disposed adjacent the reflecting surface, guide means operably connected with the blade means for reciprocating the blade means vertically along the reflecting surface, chain means operably connected with the guide means for transmitting reciprocal movement thereto, drive means connected with the chain means for selective actuation thereof, and wherein the chain means comprises sprocket means secured rearwardly of the reflecting surface, endless chain means extending between the sprocket means and movable therearound, said sprocket means being operably connected with the drive means for actuation thereby for moving the chain means around the sprocket means.

3. A wiper mechanism for rear view mirrors of vehicles as set forth in claim 2 wherein the sprocket means comprises a pair of spaced sprocket members for receiving the chain therearound, and one of said sprocket members being operably connected with the drive means for rotation thereby for moving the chain means around the sprockets.

4. A wiper mechanism for rear view mirrors of vehicles comprising housing means, a reflecting surface secured to the housing means, cover means removably secured to the housing means, a horizontally disposed wiper blade disposed adjacent the reflecting surface and vertically reciprocal therealong for wiping thereof, substantially U-shaped arm means secured to the wiper blade and extending from the wiper blade to a position spaced rearwardly of the reflecting surface, said cover means being provided with an elongated slot for receiving the arm means therethrough, mounting surface means provided within the housing and disposed rearwardly of the reflecting surface, guide rail means secured to the mounting surface and spaced therefrom, travelling block means slidably secured on the guide rail means, one end of said arm means being secured to the travelling block means for movement simultaneously therewith, sprocket and chain means secured on the mounting surface, means connecting the travelling block means with the chain, and drive means secured to the mounting surface and operably connected with the sprocket and chain means for moving the chain to transmit reciprocal movement to the travelling block means and wiper blade, and spring means interposed between the arm means and the wiper blade for constantly urging the wiper blade into a pressure engagement with the reflecting surface.

* * * * *